US011987292B2

(12) United States Patent
Hashida et al.

(10) Patent No.: US 11,987,292 B2
(45) Date of Patent: May 21, 2024

(54) VEHICLE

(71) Applicants: TOYOTA JIDOSHA KABUSHIKI KAISHA, Aichi-ken (JP); SUBARU CORPORATION, Tokyo (JP)

(72) Inventors: Shigenori Hashida, Nisshin (JP); Shintaro Kosaka, Miyoshi (JP); Satoshi Ikeda, Tokyo (JP)

(73) Assignees: TOYOTA JIDOSHA KABUSHIKI KAISHA, Aichi-Ken (JP); SUBARU CORPORATION, Tokyo (JP)

( * ) Notice: Subject to any disclaimer, the term of this patent is extended or adjusted under 35 U.S.C. 154(b) by 102 days.

(21) Appl. No.: 17/672,534

(22) Filed: Feb. 15, 2022

(65) Prior Publication Data

US 2022/0289302 A1  Sep. 15, 2022

(30) Foreign Application Priority Data

Mar. 15, 2021  (JP) ................. 2021-041780

(51) Int. Cl.
*B62D 25/08*  (2006.01)
*B62D 21/02*  (2006.01)
*B62D 21/09*  (2006.01)
*B62D 21/11*  (2006.01)
*B62D 21/15*  (2006.01)

(52) U.S. Cl.
CPC .............. *B62D 25/08* (2013.01); *B62D 21/02* (2013.01); *B62D 21/09* (2013.01); *B62D 21/11* (2013.01); *B62D 21/15* (2013.01); *B62D 21/152* (2013.01); *B62D 21/155* (2013.01); *B62D 21/157* (2013.01); *B62D 25/082* (2013.01)

(58) Field of Classification Search
CPC ...... B62D 25/08; B62D 21/155; B62D 21/11; B62D 21/02; B62D 21/09; B62D 21/157; B62D 21/15; B62D 21/152; B62D 25/082; B60R 2021/0009
USPC .................................................. 296/203.02
See application file for complete search history.

(56) References Cited

U.S. PATENT DOCUMENTS 10,118,643 B2 * 11/2018 Komiya ................. B62D 21/11
2019/0322164 A1  10/2019 Sasaki et al.

FOREIGN PATENT DOCUMENTS

| JP | 2004-276718 A | 10/2004 |
| JP | 2004276718 A | * 10/2004 |
| JP | 2013119359 A | 6/2013 |
| JP | 2019188899 A | 10/2019 |

* cited by examiner

*Primary Examiner* — Amy R Weisberg
*Assistant Examiner* — Dana D Ivey
(74) *Attorney, Agent, or Firm* — HAUPTMAN HAM, LLP (57) ABSTRACT

A vehicle includes a body including a front compartment and a subframe configured to support an installed part disposed in the front compartment. The body includes a first counterface that inclines downward in a rearward direction of the vehicle. The subframe is attached to the body from below. The subframe includes a second counterface facing the first counterface of the body. The second counterface is inclined downward in the rearward direction of the vehicle. At least one of the first counterface and the second counterface includes a portion inclined rearward toward an inner side in a right-left direction of the vehicle.

9 Claims, 11 Drawing Sheets

VEHICLE

CROSS-REFERENCE TO RELATED APPLICATION

This application claims priority to Japanese Patent Application No. 2021-041780 filed on Mar. 15, 2021, incorporated herein by reference in its entirety.

BACKGROUND

1. Technical Field

The technology of the present disclosure relates to a vehicle.

2. Description of Related Art

Japanese Unexamined Patent Application Publication No. 2013-119359 (JP 2013-119359 A) discloses a vehicle. The vehicle includes a body that has a front compartment, and a subframe attached to the body from below. The subframe supports installed parts (e.g., electric power steering) disposed in the front compartment. The body is provided with a first counterface. The subframe is provided with a second counterface facing the first counterface. These counterfaces are inclined downward in a rearward direction.

SUMMARY

In the vehicle having the above configuration, when a head-on collision occurs, the second counterface on the subframe side comes into contact with the first counterface on the body side. The aforementioned inclination is provided to these counterfaces, and accordingly the subframe moving rearward due to the collision load is pushed downward along the inclination. As a result, the subframe is disengaged from the body, whereby deformation of the body (as well as peripheral parts, etc.) is suppressed. However, when the vehicle encounters an oblique collision, rotational motion is applied to the movement of the subframe moving in the rearward direction, and there is a risk of the second counterface on the subframe side coming into contact with the first counterface on the body side at an unintended angle. When such contact occurs, an edge portion of the second counterface, for example, may dig into the first counterface. In this case, there is a risk of the subframe not being properly disengaged from the body. There is a risk that unintended deformation of the body and so forth will damage the installed parts disposed in the front compartment. The rigidity of the body having the first counterface needs to be increased in order to avoid such a situation. However, increasing the rigidity of the body increases the weight of the body.

The present disclosure provides technology that is capable of avoiding or suppressing damage to installed parts disposed in the front compartment when encountering an oblique collision, without increasing the weight of the body.

In the first aspect of the present disclosure, a vehicle includes a body including a front compartment and a subframe configured to support an installed part disposed in the front compartment. The body includes a first counterface that inclines downward in a rearward direction of the vehicle. The subframe is attached to the body from below. The subframe includes a second counterface facing the first counterface of the body. The second counterface is inclined downward in the rearward direction of the vehicle. At least one of the first counterface and the second counterface includes a portion inclined rearward toward an inner side in a right-left direction of the vehicle.

In the vehicle described above, both the first counterface on the body side and the second counterface on the subframe side facing the first counterface are inclined downward in the rearward direction. Thus, when the vehicle encounters a head-on collision, the subframe that moves rearward due to the collision load is pushed downward along the inclination of the counterfaces, and accordingly the subframe can be disengaged from the body. In addition, at least one of the first counterface on the body side and the second counterface on the subframe side includes a portion inclined rearward toward the inner side in the right-left direction of the vehicle. With such a configuration, even when the vehicle encounters an oblique collision and rotational movement toward the inner side is applied to the movement of the subframe moving rearward, the second counterface on the subframe side does not readily come into contact with the first counterface on the body side. Accordingly, a situation in which the edge portion of the second counterface digs into the first counterface is suppressed, for example, and damage to the installed part disposed in the front compartment can be suppressed or avoided.

In the vehicle according to the first aspect of the present disclosure, the first counterface may include the portion inclined rearward toward the inner side in the right-left direction of the vehicle.

In the vehicle according to the first aspect of the present disclosure, the portion inclined rearward toward the inner side in the right-left direction of the vehicle may cover the entire first counterface in the right-left direction.

In the vehicle according to the first aspect of the present disclosure, an inclination angle of the portion inclined rearward toward the inner side in the right-left direction of the vehicle in the first counterface may be larger than 5 degrees.

In the vehicle according to the first aspect of the present disclosure, the second counterface may include the portion inclined rearward toward the inner side in the right-left direction of the vehicle.

In the vehicle according to the first aspect of the present disclosure, the portion inclined rearward toward the inner side in the right-left direction of the vehicle may cover the entire second counterface in the right-left direction.

In the vehicle according to the first aspect of the present disclosure, an inclination angle of the portion inclined rearward toward the inner side in the right-left direction of the vehicle in the second counterface may be larger than 5 degrees.

In the vehicle according to the first aspect of the present disclosure, both of the first counterface and the second counterface may include the portion inclined rearward toward the inner side in the right-left direction of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

In an embodiment of the present technology, in at least part of a range of a first counterface, the first counterface may be inclined rearward toward an inner side in a right-left direction of a vehicle. With such a configuration, an inner-side portion of the first counterface provided on a body is also located rearward from an outer-side portion of the first counterface. Thus, when the vehicle encounters an oblique collision, contact of a second counterface on a subframe side, which moves rearward to the inner side due to rotational movement of the subframe, with the first counterface on the body side can be suppressed or avoided.

In the above embodiment, the first counterface may be inclined rearward toward the inner side in the right-left direction, over the entire first counterface in the right-left direction. In such a configuration as well, the first counterface is located rearward toward the inner-side portion, and accordingly contact of the second counterface on the subframe side that moves rearward to the inner side when the vehicle encounters an oblique collision with the first counterface on the body side can be suppressed or avoided.

In the above embodiment, an inclination angle of the first counterface in the right-left direction may be larger than 5 degrees. Note that the specific numerical value of the inclination angle of the first counterface in the right-left direction is not limited in particular. Note however, that due to the inner-side portion of the counterface being located rearward from the outer-side portion thereof, the larger the inclination angle of the first counterface in the right-left direction is, strong contact of the second counterface on the subframe side that moves rearward and inward when the vehicle encounters an oblique collision with the first counterface on the body side can be suppressed or avoided even more.

In addition to or in place of the above, in at least part of the range of the second counterface, the second counterface may be inclined rearward toward the inner side in the right-left direction of the vehicle. With such a configuration, the outer-side portion of the second counterface provided on the subframe is also located forward from the inner-side portion of the second counterface. Thus, when the vehicle encounters an oblique collision, contact of the second counterface on the subframe side, which moves rearward to the inner side due to rotational movement of the subframe, with the first counterface on the body side can be suppressed or avoided.

In the above embodiment, the second counterface may be inclined rearward toward the inner side in the right-left direction, over the entire second counterface in the right-left direction. In such a configuration as well, the second counterface is located forward toward the outer-side portion, and accordingly contact of the second counterface on the subframe side that moves rearward to the inner side when the vehicle encounters an oblique collision with the first counterface on the body side can be suppressed or avoided.

In the above embodiment, an inclination angle of the second counterface in the right-left direction may be larger than 5 degrees. Note that the specific numerical value of the inclination angle of the second counterface in the right-left direction is not limited in particular. Note however, that the larger the inclination angle of the second counterface in the right-left direction is, the more the outer-side portion of this counterface is located forward from the inner-side portion, and accordingly strong contact of the second counterface on the subframe side that moves rearward to the inner side when the vehicle encounters an oblique collision with the first counterface on the body side can be suppressed or avoided.

In the above embodiment, in at least part of the range of the first counterface and the second counterface, both of the first counterface and the second counterface may be inclined rearward toward the inner side in the right-left direction of the vehicle. With such a configuration, in addition to the above-described operational advantages, local contact between the first counterface on the body side and the second counterface on the subframe side can be suppressed when the vehicle encounters a head-on collision.

Embodiment

A vehicle 10 according to an embodiment will be described with reference to the drawings. The vehicle 10 is a so-called automobile, and is a vehicle that travels over a road surface. Here, the direction FR in the drawings indicates forward in the front-rear direction of the vehicle 10. The direction RR in the drawings indicates rearward in the front-rear direction of the vehicle 10. Also, the direction LH in the drawings indicates leftward in the right-left direction (or width direction) of the vehicle 10. The direction RH in the drawings indicates rightward in the right-left direction of the vehicle 10. The direction UP in the drawings indicates upward in the up-down direction of the vehicle 10. The direction DW in the drawings indicates downward in the up-down direction of the vehicle 10. Note that in the present specification, the front-rear direction of the vehicle 10, the right-left direction of the vehicle 10, and the up-down direction of the vehicle 10, may be referred to simply as the front-rear direction, the right-left direction, and the up-down direction, respectively.

Figure 1:
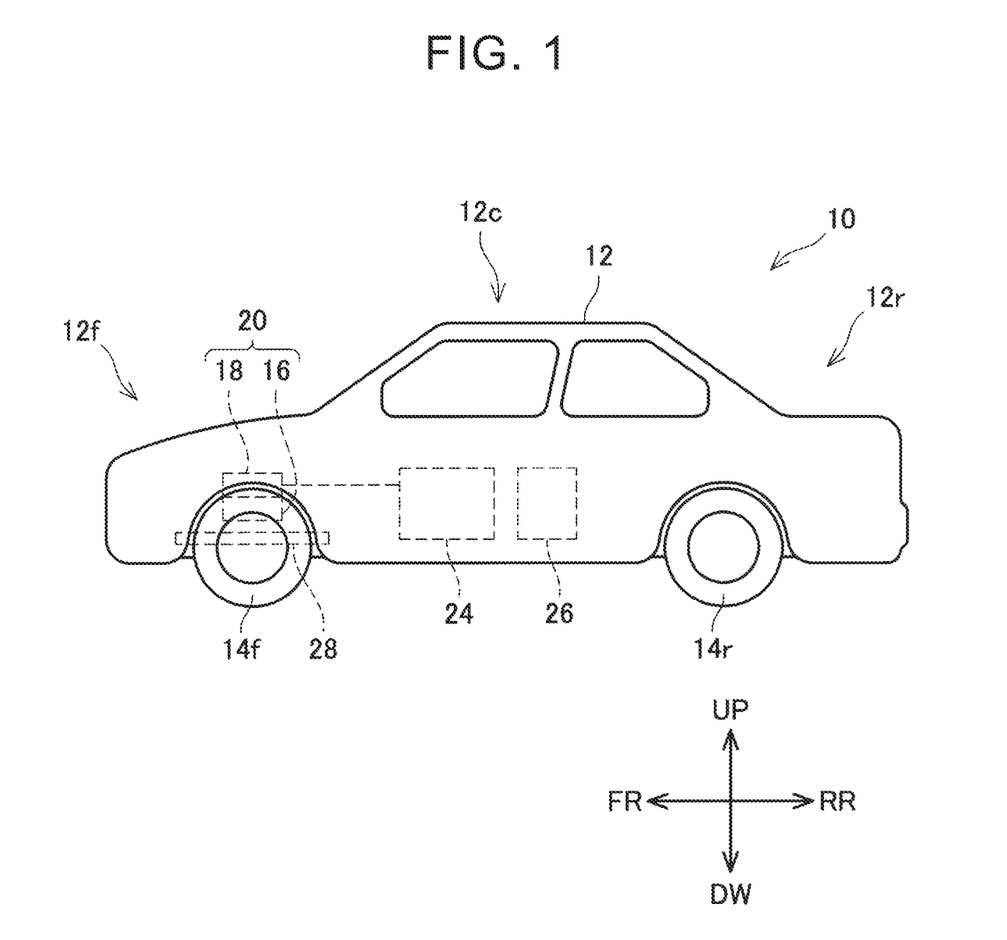
FIG. 1 is a diagram schematically illustrating a vehicle 10 according to an embodiment.
Figure 2:
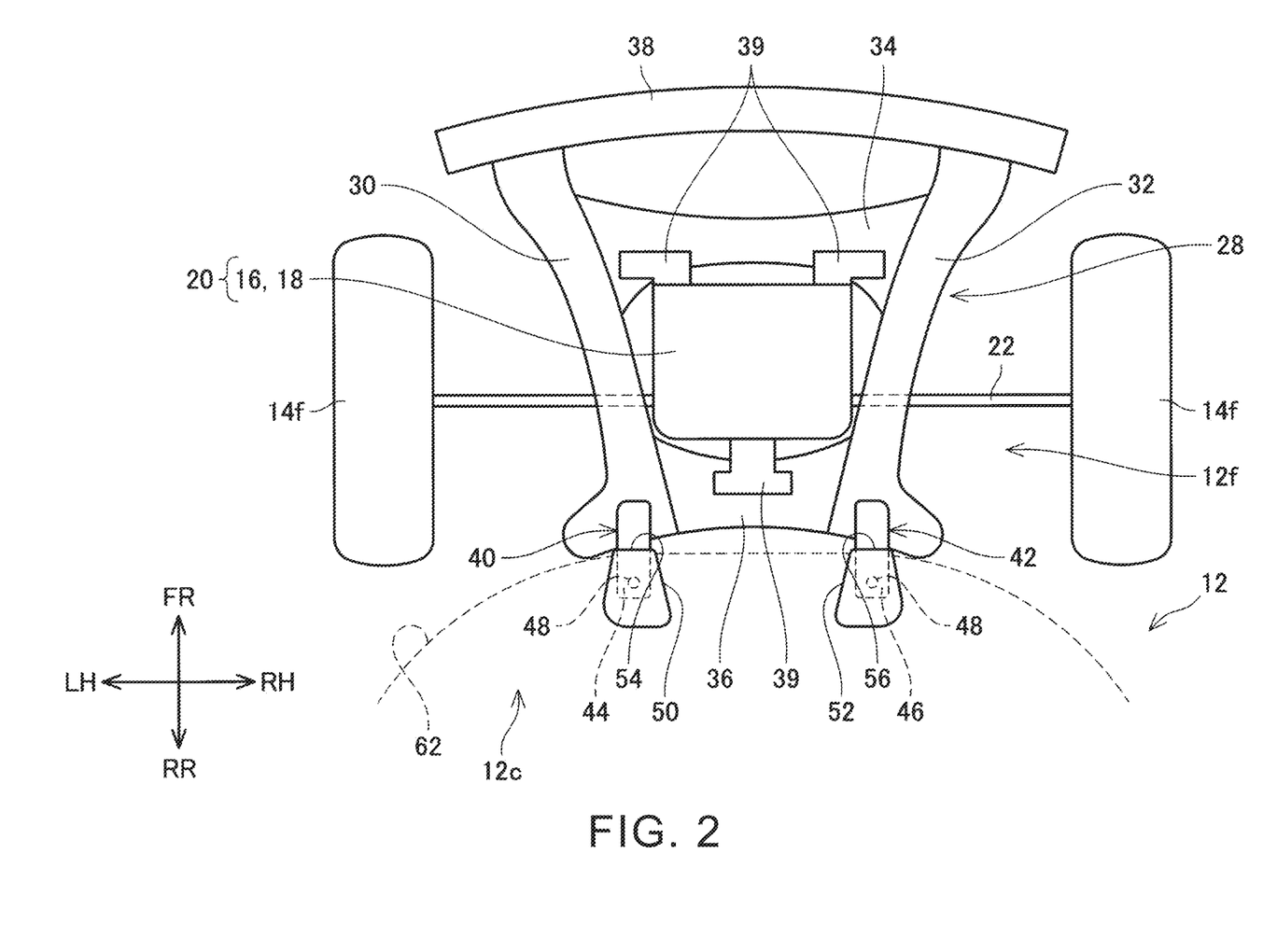
FIG. 2 is a diagram illustrating a structure in a front compartment 12f, in which a dash panel 62 is indicated by a dashed line, and front side members 58 and 60 are omitted.

As illustrated in FIG. 1, the vehicle 10 includes a body 12 and a plurality of wheels 14$f$ and 14$r$. The body 12 is configured of a metal such as steel material, aluminum alloy, or the like, although not limited thereto in particular. The body 12 generally has a front compartment 12$f$, a cabin 12$c$, and a rear compartment 12$r$. The front compartment 12$f$ is located forward from the cabin 12$c$. The rear compartment 12$r$ is located rearward from the cabin 12$c$. As illustrated in FIG. 2, the front compartment 12$f$ and the cabin 12$c$ are separated by a dash panel 62 in the vehicle 10 according to the present embodiment. The wheels 14$f$ and 14$r$ are rotatably attached to the body 12. The wheels 14$f$ and 14$r$ include a pair of front wheels 14$f$ located at a front portion of the body 12 and a pair of rear wheels 14$r$ located at a rear portion of the body 12. The front wheels 14$f$ are disposed coaxially with each other, and the rear wheels 14$r$ are also disposed coaxially with each other. The number of wheels 14$f$ and 14$r$ is not limited to four.

As illustrated in FIGS. 1 and 2, the vehicle 10 further includes a motor 16 that is an electric motor, and a power control unit 18 (hereinafter referred to as "PCU 18"). A mechanical-electrical integrated unit 20 is a unit in which the motor 16 and the PCU 18 are integrated. The mechanical-electrical integrated unit 20 is installed in the vehicle 10, although not limited thereto in particular. The motor 16 drives at least one of the wheels 14$f$ and 14$r$ (e.g., the front wheels 14$f$). As illustrated in FIG. 2, the mechanical-electrical integrated unit 20 is connected to the front wheels 14$f$ via a drive shaft 22. Accordingly, the motor 16 can drive the front wheels 14$f$. Note that the motor 16 is not limited to driving the front wheels 14$f$, and it is sufficient to be configured to drive at least one of the wheels 14$f$ and 14$r$.

As illustrated in FIG. 1, the vehicle 10 further includes a battery unit 24 and an electronic control unit 26 (hereinafter referred to as "ECU 26"). The battery unit 24 contains therein a plurality of secondary battery cells. The battery unit 24 is configured to be repeatedly rechargeable by external electric power. The battery unit 24 is connected to the motor 16 via the PCU 18, and supplies electric power to the motor 16. The PCU 18 has a direct current (DC)-DC converter and/or an inverter built in, and controls the electric power transmitted between the battery unit 24 and the motor 16. The ECU 26 has a processor. The ECU 26 gives control commands to the PCU 18 in response to user operations, for example.

The vehicle 10 may further include other prime movers, such as an internal combustion engine, in place of or in addition to the motor 16. Also, the vehicle 10 may include other power sources such as a fuel cell unit or a solar cell panel, in addition to or in place of the battery unit 24. As described above, the vehicle 10 is not limited to electrified vehicles, and also includes internal combustion engine vehicles, hybrid electric vehicles, fuel cell electric vehicles, solar cars, and so forth.

As illustrated in FIGS. 1 and 2, the vehicle 10 further includes a subframe 28. The subframe 28 is configured of a metal such as steel material, aluminum alloy, or the like, although not limited thereto in particular. As illustrated in FIG. 2, the subframe 28 has a generally frame-like form, and includes a pair of side rails made up of a left side rail 30 and a right side rail 32, and a front cross member 34 and a rear cross member 36 that extend between side rails. The left side rail 30 and the right side rail 32 have shapes that are symmetrical with each other in the right-left direction. The left side rail 30 and the right side rail 32 each extend along the front-rear direction of the vehicle 10. A bumper reinforcement 38 is attached to front end portions of the two side rails 30 and 32 via a crash box (omitted from illustration). Note that the specific shapes and structures of the two side rails 30 and 32 are not limited in particular.

Figure 3:
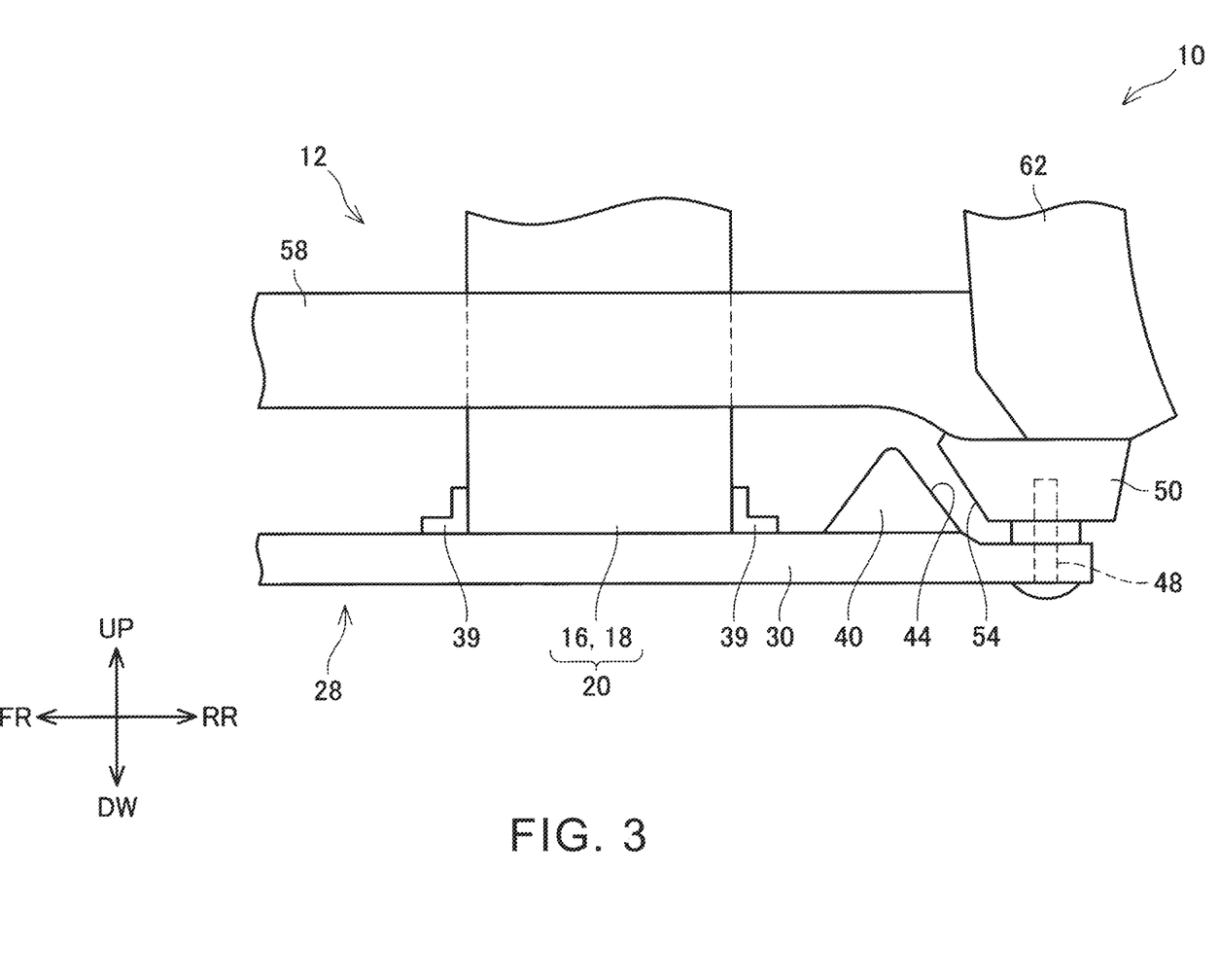
FIG. 3 is a diagram, illustrating in side view, a positional relation between a left rail attaching portion 50 of a body 12, and a left contact portion 40 of a left side rail 30 of a subframe 28.
Figure 4:
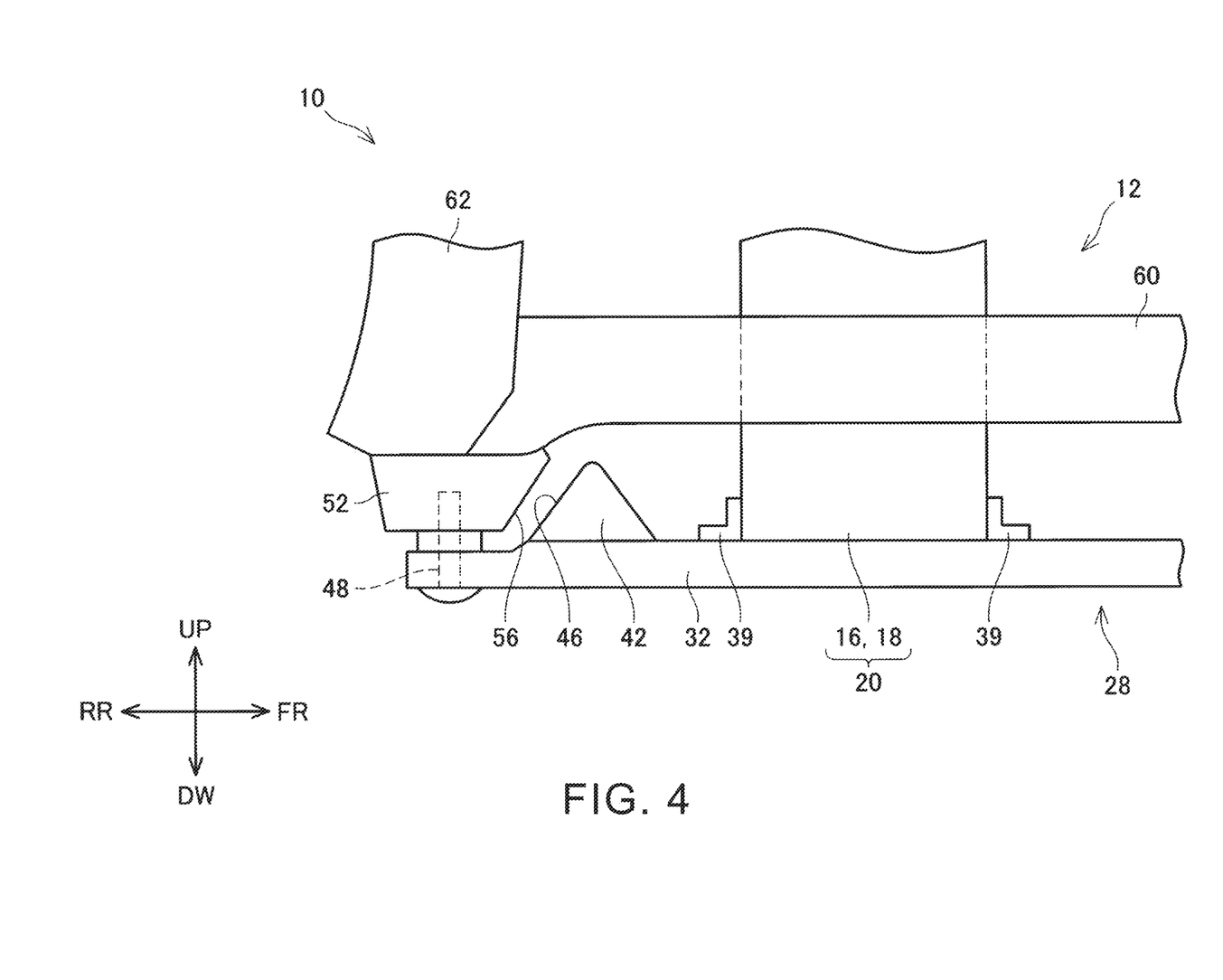
FIG. 4 is a diagram, illustrating in side view, a positional relation between a right rail attaching portion 52 of the body 12, and a right contact portion 42 of a right side rail 32 of the subframe 28.

As illustrated in FIGS. 3 and 4, the subframe 28 is attached from below the body 12, and is located at the bottom portion of the front compartment 12$f$. The subframe 28 is fixed to the body 12 at a plurality of fixing places. The fixing places include rear end portions of the side rails 30 and 32, although not limited thereto in particular. A bolt 48 is provided at each of the fixing places. The subframe 28 is fixed to the body 12 using those bolts 48.

The mechanical-electrical integrated unit 20 is attached to the subframe 28. As one example, the mechanical-electrical integrated unit 20 is fixed to the subframe 28 via a plurality of brackets 39. The subframe 28 supports the mechanical-electrical integrated unit 20 from below. The mechanical-electrical integrated unit 20 is disposed in the front compartment 12f. Note that other installed parts may be attached to the subframe 28 in place of the mechanical-electrical integrated unit 20. The subframe 28 is not limited to supporting the mechanical-electrical integrated unit 20, and can support various types of installed parts disposed in the front compartment 12f. For example, a gearbox or the like may be disposed in the front compartment 12f and supported by the subframe 28, in addition to or in place of the mechanical-electrical integrated unit 20 including the motor 16 and the PCU 18.

As illustrated in FIG. 3, the body 12 includes a left front side member 58 and a left rail attaching portion 50. The left front side member 58 and the left rail attaching portion 50 are located on the left side portion of the front compartment 12f. The rear end portion of the left side rail 30 of the subframe 28 is fixed to the left rail attaching portion 50 using a bolt 48. As one example, the left rail attaching portion 50 is fixed to the left front side member 58 (and the dash panel 62). The left rail attaching portion 50 has a first counterface 54. The first counterface 54 is located on the front face of the left rail attaching portion 50, and faces generally forward. The first counterface 54 is inclined downward in a rearward direction. The first counterface 54 may be inclined downward in the rearward direction of the vehicle 10 over at least part of the range thereof. That is to say, it is sufficient for part or all of the first counterface 54 to be inclined downward in the rearward direction of the vehicle 10. Also, the portion to which the left rail attaching portion 50 is fixed is not limited in particular. That is to say, the left rail attaching portion 50 may be provided in a portion of the body 12 different from the left front side member 58 (and the dash panel 62) of the body 12.

As illustrated in FIG. 3, the left side rail 30 of the subframe 28 is provided with a left contact portion 40 at a position facing the left rail attaching portion 50 in the vehicle front-rear direction. The left contact portion 40 has a second counterface 44. The second counterface 44 is located on the rear face of the left contact portion 40, and faces the first counterface 54 of the left rail attaching portion 50. The second counterface 44, like the first counterface 54 of the left rail attaching portion 50, is inclined downward in the rearward direction of the vehicle 10. Note that the second counterface 44 of the left contact portion 40 may be inclined downward in the rearward direction of the vehicle 10 over at least part of the range thereof, as well. That is to say, it is sufficient for part or all of the second counterface 44 to be inclined downward in the rearward direction of the vehicle 10.

As illustrated in FIG. 4, the body 12 includes a right front side member 60 and a right rail attaching portion 52. The right front side member 60 and the right rail attaching portion 52 are provided bilaterally symmetrically with the left front side member 58 and the left rail attaching portion 50 described above. That is to say, the right front side member 60 and the right rail attaching portion 52 are located on the right side portion of the front compartment 12f. The rear end portion of the right side rail 32 of the subframe 28 is fixed to the right rail attaching portion 52 using a bolt 48. The right rail attaching portion 52 has a first counterface 56, and the first counterface 56 is inclined downward in the rearward direction. It is sufficient for the first counterface 56 of the right rail attaching portion 52 to be inclined downward in the rearward direction of the vehicle 10 over at least part of the range thereof, as well.

As illustrated in FIG. 4, the right side rail 32 of the subframe 28 is provided with a right contact portion 42 at a position facing the right rail attaching portion 52. The right contact portion 42 has a second counterface 46. The second counterface 46 faces the first counterface 56 of the right rail attaching portion 52. The second counterface 46 of the right contact portion 42, like the first counterface 56 of the right rail attaching portion 52, is inclined downward in the rearward direction of the vehicle 10. It is sufficient for the second counterface 46 of the right contact portion 42 to be inclined downward in the rearward direction of the vehicle 10 over at least part of the range thereof, as well.

Figure 5:
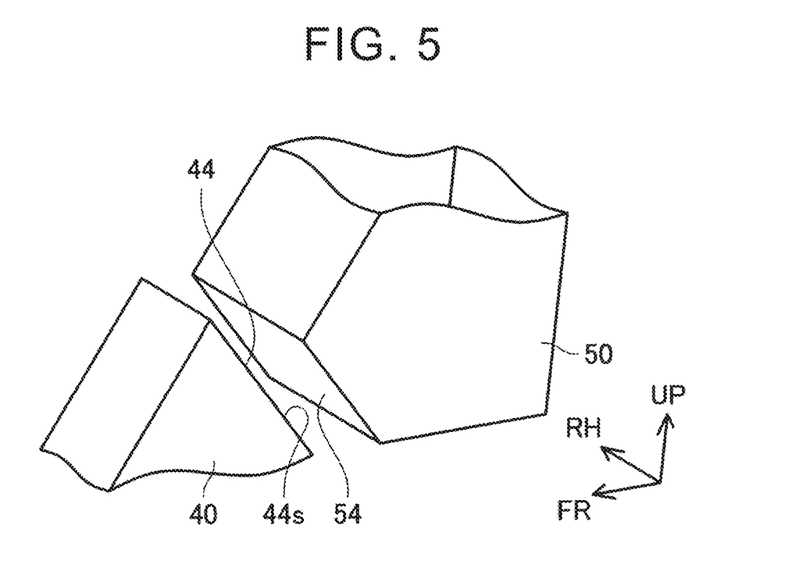
FIG. 5 is a perspective view illustrating a positional relation between a first counterface 54 of the left rail attaching portion 50 in the body 12 and a second counterface 44 of the left contact portion 40 in the subframe 28.
Figure 6:
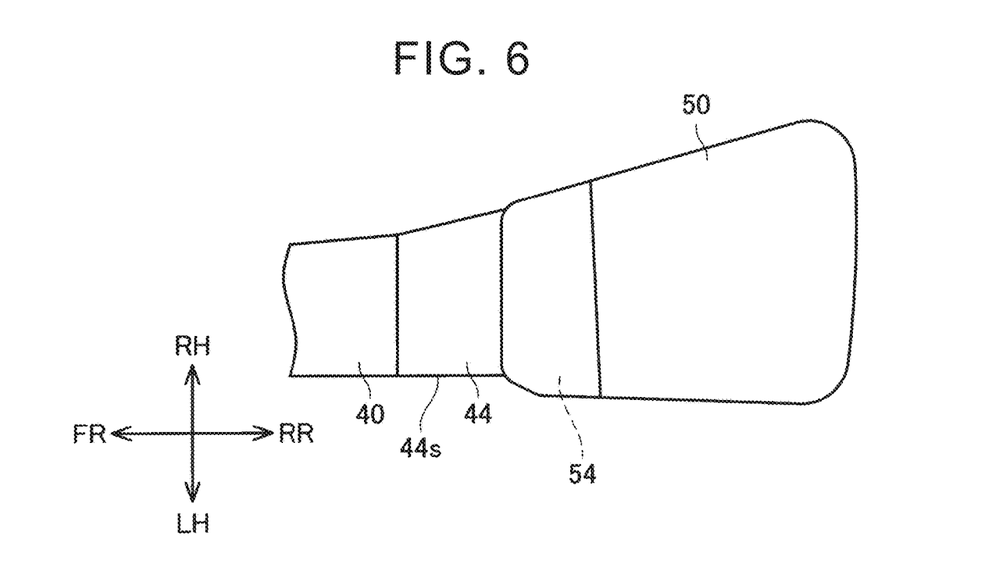
FIG. 6 is a diagram, illustrating in plan view, a positional relation between the first counterface 54 of the left rail attaching portion 50 in the body 12 and the second counterface 44 of the left contact portion 40 in the subframe 28.

As described above, the relation between the first counterface 54 of the left rail attaching portion 50 in the body 12 and the second counterface 44 of the left contact portion 40 in the subframe 28 is the same as the relation between the first counterface 56 of the right rail attaching portion 52 in the body 12 and the second counterface 46 of the right contact portion 42 in the subframe 28. Accordingly, in FIGS. 5 and 6, just the relation between the first counterface 54 of the left rail attaching portion 50 in the body 12 and the second counterface 44 of the left contact portion 40 in the subframe 28 is illustrated representatively.

With the above configuration, when the vehicle 10 encounters a head-on collision, the second counterfaces 44 and 46 on the subframe 28 side come into contact with the first counterfaces 54 and 56 on the body 12 side. At this time, the subframe 28 moves rearward while maintaining the second counterfaces 44 and 46 on the subframe 28 side parallel to the first counterfaces 54 and 56 on the body 12 side. The first counterfaces 54 and 56 and the second counterfaces 44 and 46 are provided with the aforementioned inclinations, and accordingly the subframe 28 moving rearward due to the collision load is pushed downward along the inclinations. As a result, the subframe 28 is disengaged from the body 12, whereby deformation of the body 12 (as well as peripheral parts, etc.) is suppressed. However, when the vehicle 10 encounters an oblique collision, rotational motion is applied to the movement of the subframe 28 moving rearward, and there is a risk of the second counterfaces 44 and 46 on the subframe 28 side coming into contact with the first counterfaces 54 and 56 on the body 12 side at an unintended angle. For example, when a collision load is applied to the subframe 28 from a left forward direction, the subframe 28 moves rearward and inward, and accordingly there is a risk of a left edge portion 44s of the second counterface 44 provided on the left side rail 30 of the subframe 28 locally coming into contact with the first counterface 54 on the body 12 side. When such contact occurs, the left edge portion 44s of the second counterface 44 may dig into the first counterface 54. In this case, there is a risk of the subframe 28 not being properly disengaged from the body 12, and of unintended deformation and so forth of the body 12 damaging the installed parts disposed in the front compartment 12f, such as the mechanical-electrical integrated unit 20.

Regarding the above, in the vehicle 10 according to the present embodiment, at least one of the first counterfaces 54 and 56 on the body 12 side and the second counterfaces 44 and 46 on the subframe 28 side may be further inclined in the right-left direction of the vehicle 10. Specifically, at least one of the first counterfaces 54 and 56 and the second counterfaces 44 and 46 may be inclined rearward toward the inner side in the right-left direction of the vehicle 10 over at least part of the range thereof. In FIGS. 7A through 12C, the first counterface 54 of the left rail attaching portion 50 and the second counterface 44 of the left contact portion 40 are given exemplarily, and the behaviors thereof are schematically illustrated, for the sake of convenience of description. FIGS. 7A, 8A, 9A, 10A, 11A, and 12A illustrate specific configurations of the first counterface 54 and the second counterface 44 in the vehicle 10 according to the present embodiment. Additionally, FIGS. 7B, 7C, 8B, 8C, 9B, 9C, 10B, 10C, 11B, 11C, 12B, and 12C illustrate change in the positional relation between the first counterface 54 and the second counterface 44 over time when the vehicle 10 encounters an oblique collision.

Figure 7A:
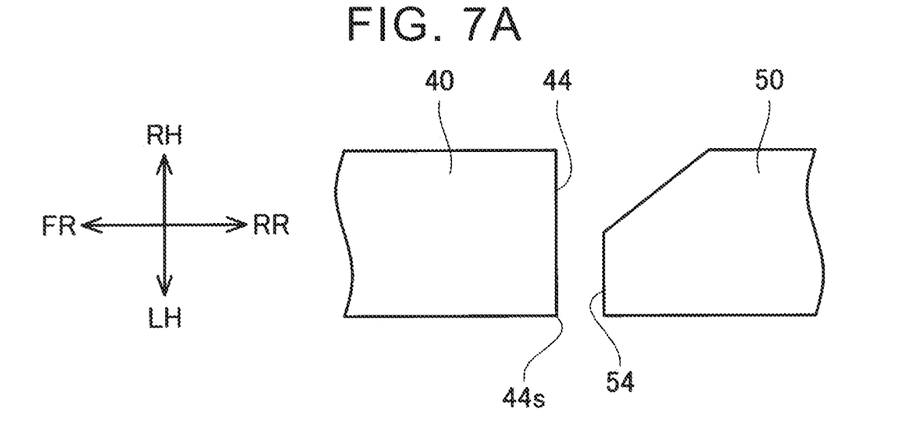
FIG. 7A is a diagram illustrating an example of a positional relation between the first counterface 54 on the body 12 side and the second counterface 44 on the subframe 28 side when the vehicle 10 encounters an oblique collision.
Figure 7B:
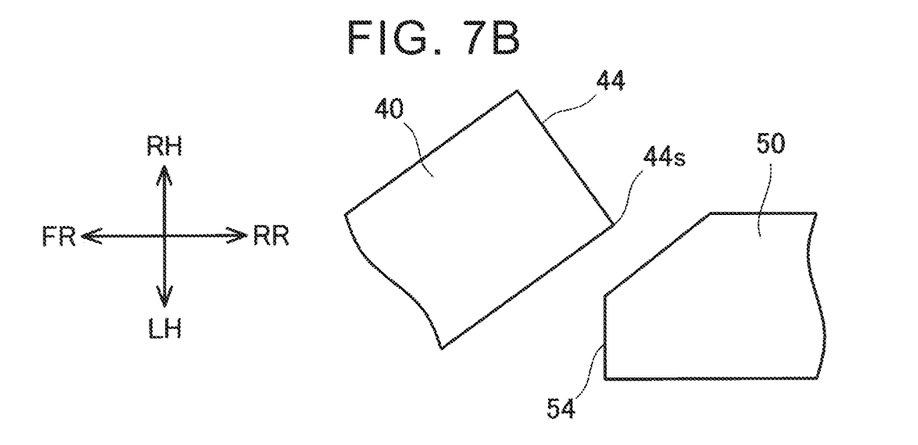
FIG. 7B is a diagram illustrating an example of the positional relation between the first counterface 54 on the body 12 side and the second counterface 44 on the subframe 28 side when the vehicle 10 encounters an oblique collision.
Figure 7C:
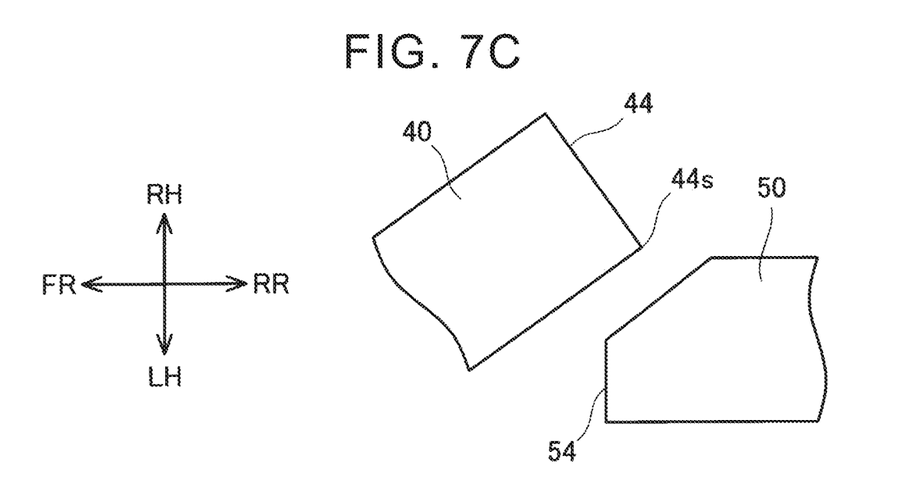
FIG. 7C is a diagram illustrating an example of the positional relation between the first counterface 54 on the body 12 side and the second counterface 44 on the subframe 28 side when the vehicle 10 encounters an oblique collision.

FIGS. 7A through 7C illustrate an example in which an inclination in the right-left direction of the vehicle 10 is provided to part of the range of the first counterface 54 on the body 12 side. As described above, the first counterface 54 on the body 12 side is inclined downward in the rearward direction with respect to the up-down direction. In addition to this, as illustrated in FIG. 7A, the first counterface 54 on the body 12 side is inclined rearward toward the right side of the vehicle 10 (i.e., inner side of the vehicle 10) over part of the range thereof. On the other hand, the second counterface 44 on the subframe 28 side is inclined downward in the rearward direction, but has no inclination in the right-left direction.

With the above configuration, the inner-side portion of the first counterface 54 provided on the body 12 is also located rearward from the outer-side portion of the first counterface 54 (see FIG. 7A). When the vehicle 10 encounters an oblique collision, the subframe 28 moves rearward and inward along with the rotational movement, as illustrated in FIGS. 7B and 7C. The inner-side portion of the first counterface 54 provided on the body 12 is inclined rearward toward the inner side in the right-left direction, and accordingly contact of the second counterface 44 on the subframe 28 side with the first counterface 54 on the body 12 side can be suppressed or avoided at this time. Thus, a situation such as the left edge portion 44s of the second counterface 44 digging into the first counterface 54, for example, is suppressed, and the subframe 28 is assisted in being properly disengaged from the body 12. As a result, damage to the installed parts disposed in the front compartment 12f, such as the mechanical-electrical integrated unit 20, can be suppressed or avoided.

Figure 8A:
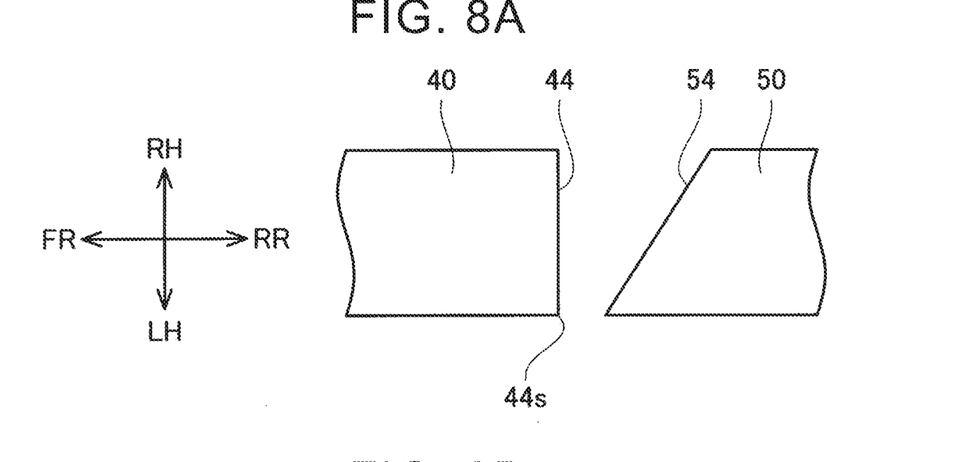
FIG. 8A is a diagram illustrating an example of a positional relation between the first counterface 54 on the body 12 side and the second counterface 44 on the subframe 28 side when the vehicle 10 encounters an oblique collision.
Figure 8B:
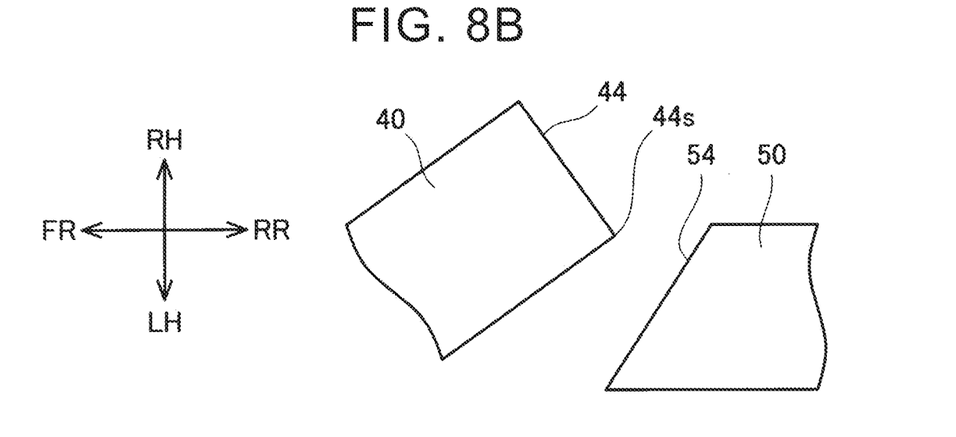
FIG. 8B is a diagram illustrating an example of the positional relation between the first counterface 54 on the body 12 side and the second counterface 44 on the subframe 28 side when the vehicle 10 encounters an oblique collision.
Figure 8C:
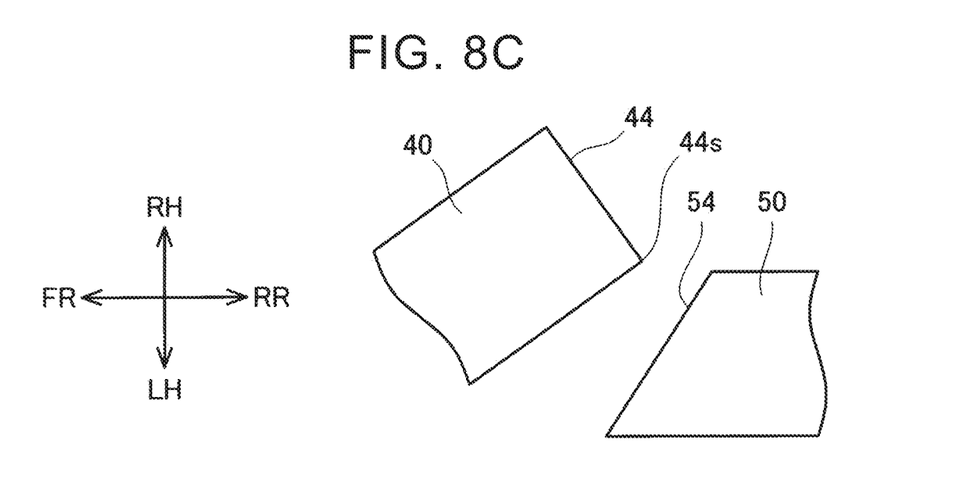
FIG. 8C is a diagram illustrating an example of the positional relation between the first counterface 54 on the body 12 side and the second counterface 44 on the subframe 28 side when the vehicle 10 encounters an oblique collision.

FIGS. 8A through 8C illustrate an example in which an inclination in the right-left direction of the vehicle 10 is provided over all of the first counterface 54 on the body 12 side. Such a configuration also enables contact of the second counterface 44 on the subframe 28 side (the left edge portion 44s in the illustrated example) with the first counterface 54 on the body 12 side to be suppressed or avoided when the vehicle 10 encounters an oblique collision, as illustrated over time in FIGS. 8A through 8C.

Figure 9A:
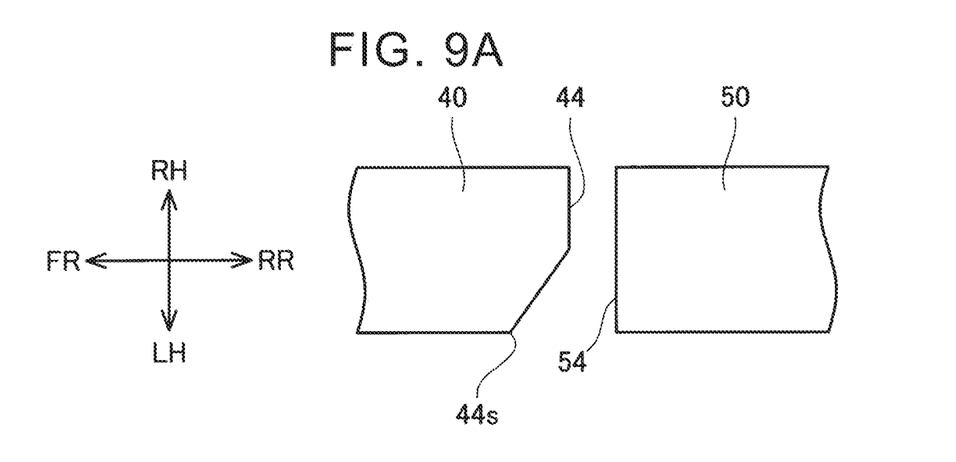
FIG. 9A is a diagram illustrating an example of a positional relation between the first counterface 54 on the body 12 side and the second counterface 44 on the subframe 28 side when the vehicle 10 encounters an oblique collision.
Figure 9B:
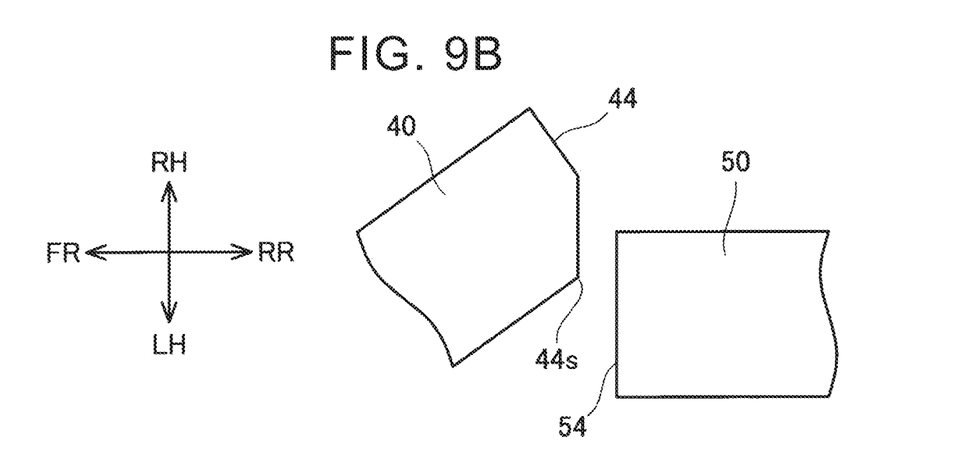
FIG. 9B is a diagram illustrating an example of the positional relation between the first counterface 54 on the body 12 side and the second counterface 44 on the subframe 28 side when the vehicle 10 encounters an oblique collision.
Figure 9C:
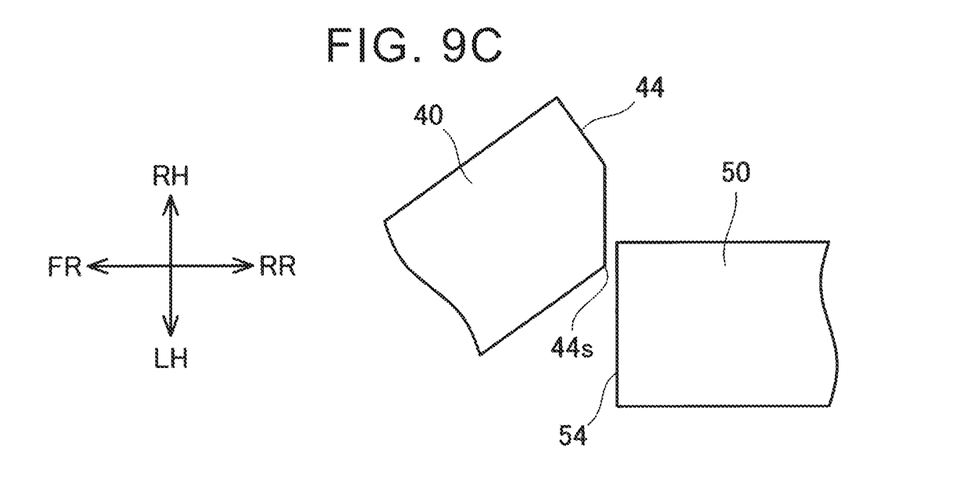
FIG. 9C is a diagram illustrating an example of the positional relation between the first counterface 54 on the body 12 side and the second counterface 44 on the subframe 28 side when the vehicle 10 encounters an oblique collision.

FIGS. 9A through 9C illustrate an example in which an inclination in the right-left direction of the vehicle 10 is provided to part of the range of the second counterface 44 on the subframe 28 side, instead of on the first counterface 54 on the body 12 side. As illustrated in FIG. 9A, the second counterface 44 on the subframe 28 side is inclined rearward toward the right side of the vehicle 10 (i.e., inner side of the vehicle 10) over part of the range thereof. Conversely, the first counterface 54 on the body 12 side is inclined downward in the rearward direction, but has no inclination in the right-left direction. With such a configuration, the outer-side portion of the second counterface 44 on the subframe 28 side is also located forward from the inner-side portion of the second counterface 44 (see FIG. 9A). Accordingly, contact of the second counterface 44 on the subframe 28 side (the left edge portion 44s in the illustrated example) with the first counterface 54 on the body 12 side can be suppressed or avoided when the vehicle 10 encounters an oblique collision, as illustrated over time in FIGS. 9A through 9C.

Figure 10A:
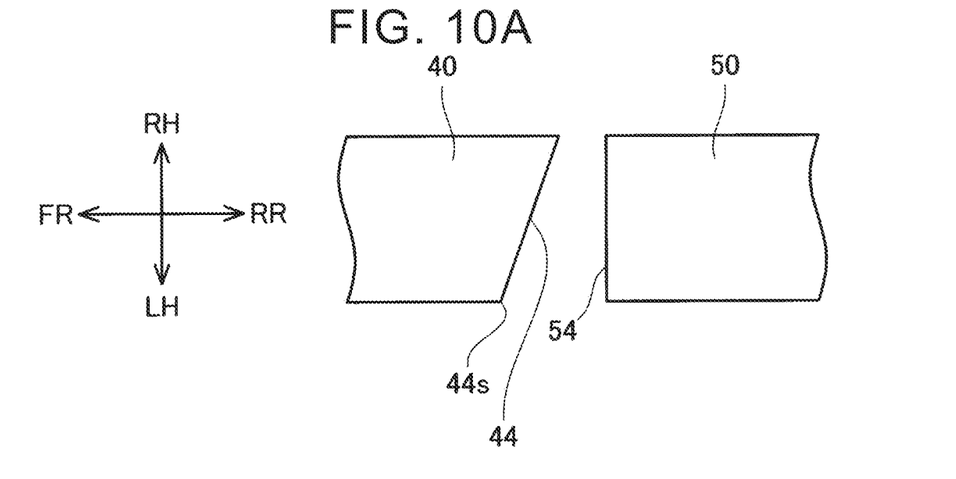
FIG. 10A is a diagram illustrating an example of a positional relation between the first counterface 54 on the body 12 side and the second counterface 44 on the subframe 28 side when the vehicle 10 encounters an oblique collision.
Figure 10B:
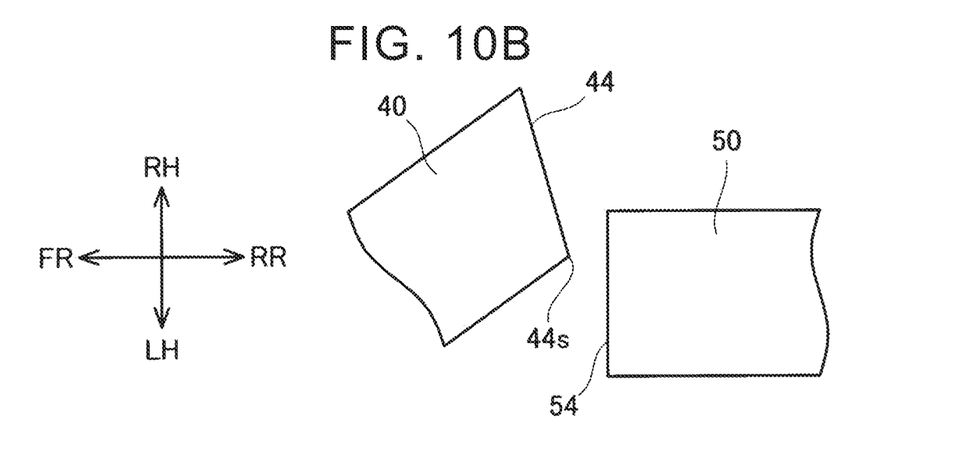
FIG. 10B is a diagram illustrating an example of the positional relation between the first counterface 54 on the body 12 side and the second counterface 44 on the subframe 28 side when the vehicle 10 encounters an oblique collision.
Figure 10C:
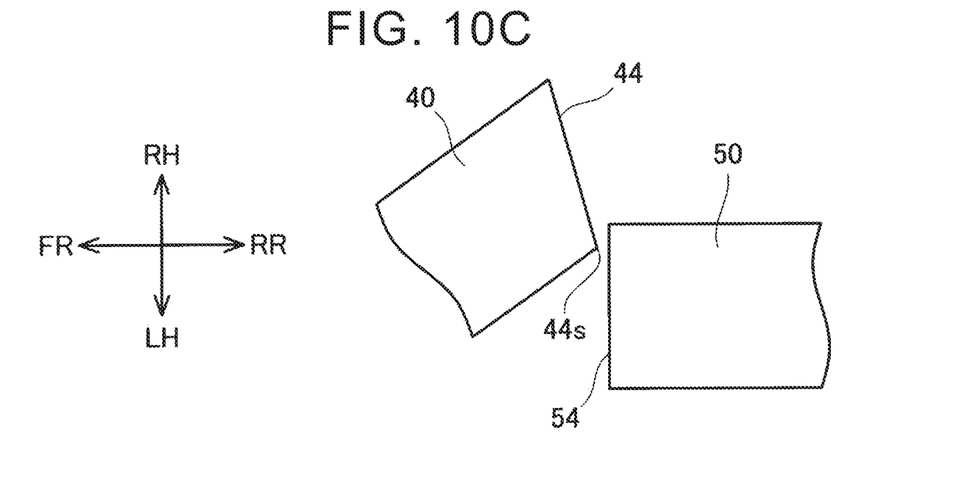
FIG. 10C is a diagram illustrating an example of the positional relation between the first counterface 54 on the body 12 side and the second counterface 44 on the subframe 28 side when the vehicle 10 encounters an oblique collision.

FIGS. 10A through 10C illustrate an example in which an inclination in the right-left direction of the vehicle 10 is provided over all of the second counterface 44 on the subframe 28 side. Such a configuration also enables contact of the second counterface 44 on the subframe 28 side (the left edge portion 44s in the illustrated example) with the first counterface 54 on the body 12 side to be suppressed or avoided when the vehicle 10 encounters an oblique collision, as illustrated over time in FIGS. 10A through 10C.

Figure 11A:
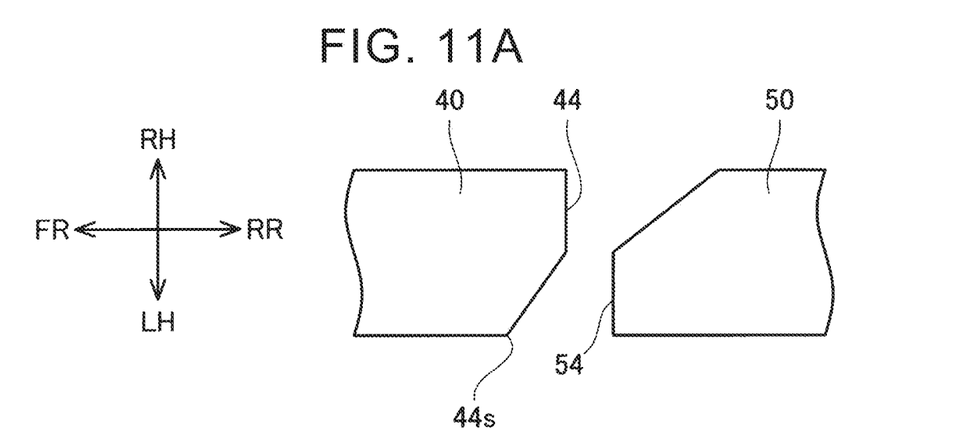
FIG. 11A is a diagram illustrating an example of a positional relation between the first counterface 54 on the body 12 side and the second counterface 44 on the subframe 28 side when the vehicle 10 encounters an oblique collision.
Figure 11B:
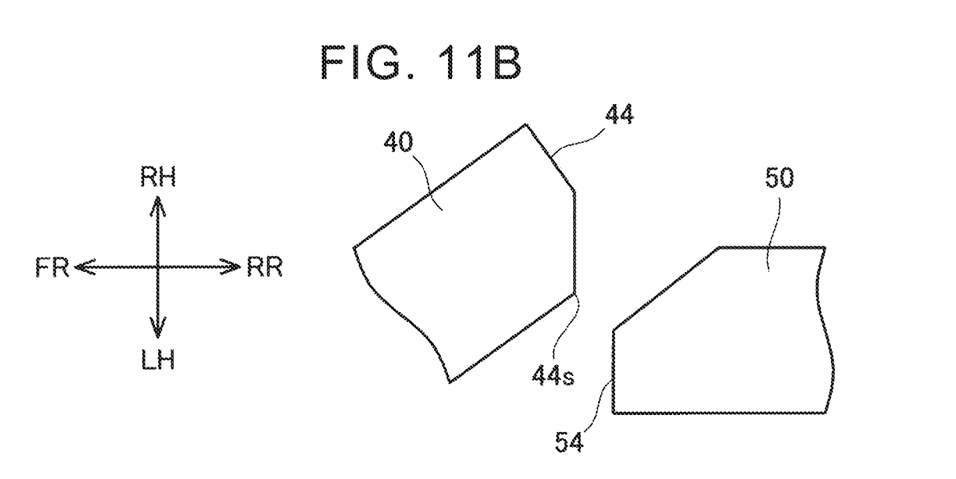
FIG. 11B is a diagram illustrating an example of the positional relation between the first counterface 54 on the body 12 side and the second counterface 44 on the subframe 28 side when the vehicle 10 encounters an oblique collision.
Figure 11C:
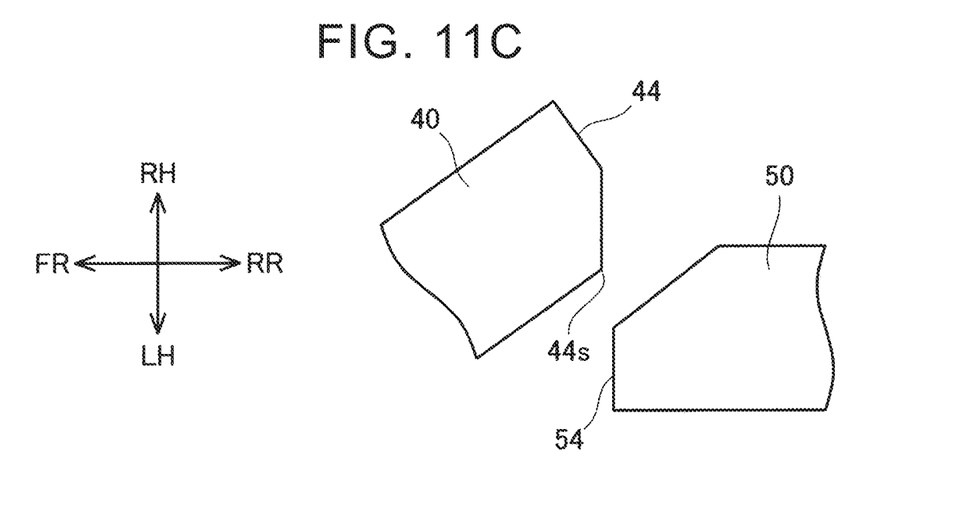
FIG. 11C is a diagram illustrating an example of the positional relation between the first counterface 54 on the body 12 side and the second counterface 44 on the subframe 28 side when the vehicle 10 encounters an oblique collision.
Figure 12A:
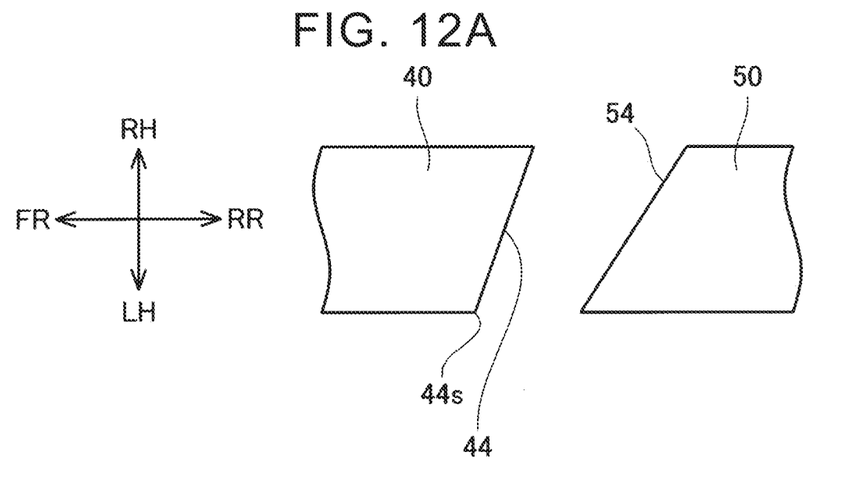
FIG. 12A is a diagram illustrating an example of a positional relation between the first counterface 54 on the body 12 side and the second counterface 44 on the subframe 28 side when the vehicle 10 encounters an oblique collision.
Figure 12B:
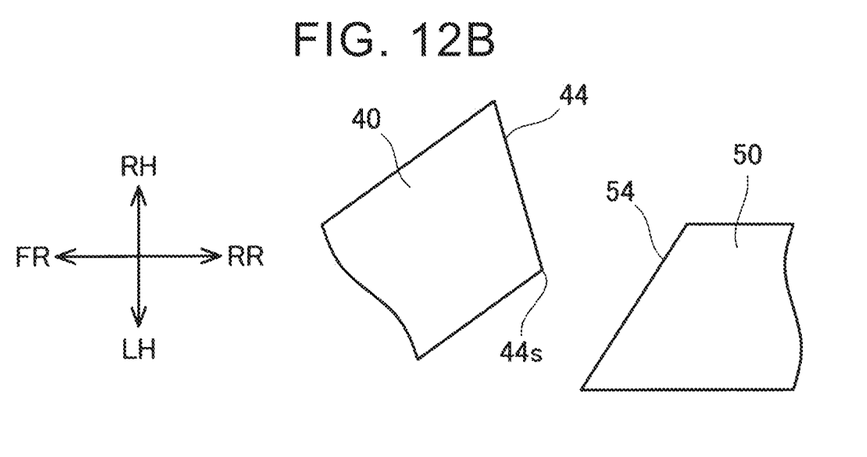
FIG. 12B is a diagram illustrating an example of the positional relation between the first counterface 54 on the body 12 side and the second counterface 44 on the subframe 28 side when the vehicle 10 encounters an oblique collision.
Figure 12C:
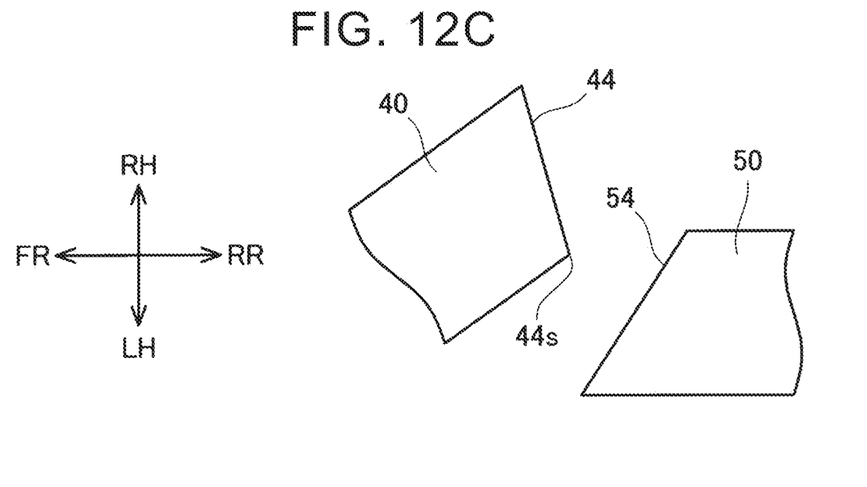
FIG. 12C is a diagram illustrating an example of the positional relation between the first counterface 54 on the body 12 side and the second counterface 44 on the subframe 28 side when the vehicle 10 encounters an oblique collision.

FIGS. 11A through 11C illustrate an example in which an inclination in the right-left direction of the vehicle 10 is provided to both of the first counterface 54 on the body 12 side and the second counterface 44 on the subframe 28 side, over part of the range thereof. FIGS. 12A through 12C illustrate an example in which an inclination in the right-left direction of the vehicle 10 is provided to both of the first counterface 54 on the body 12 side and the second counterface 44 on the subframe 28 side over the all range thereof. Such a configuration also enables contact of the second counterface 44 on the subframe 28 side (the left edge portion 44s in the illustrated example) with the first counterface 54 on the body 12 side to be suppressed or avoided when the vehicle 10 encounters an oblique collision, as illustrated over time in each of FIGS. 11A through 11C and 12A through 12C. In addition to this, local contact between the first counterface 54 on the body 12 side and the second counterface 44 on the subframe 28 side can be suppressed when the vehicle 10 encounters a head-on collision.

As one example, the inclination angle of the first counterface 54 on the body 12 side in the right-left direction may be larger than 5 degrees. In addition to or instead of the above, the inclination angle of the second counterface 44 on the subframe 28 side in the right-left direction may be larger than 5 degrees. Note that the specific numerical values of the inclination angles of the first counterface 54 and the second counterface 44 in the right-left direction are not limited in particular. Note however, that the larger the inclination angle of the first counterface 54 and the second counterface 44 in the right-left direction is, strong contact of the second counterface 44 on the subframe 28 side that moves rearward and inward when the vehicle 10 encounters an oblique collision with the first counterface 54 on the body 12 side can be suppressed or avoided even more.

Note that the distance over which the subframe 28 is pushed downward along the inclination of the first counterface 54 on the body 12 side when the vehicle 10 encounters a head-on collision or an oblique collision is not limited in particular. As one example, in the vehicle 10 according to the present embodiment, reducing the dimension of the second counterface 44 in the up-down direction, that faces the first counterface 54, enables the distance over which the subframe 28 is pushed downward along the inclination of the first counterface 54, when the vehicle 10 encounters a collision, to be shortened. Thus, the subframe 28 can be disengaged from the body 12 at an early stage. In this way, by adjusting the distance over which the subframe 28 is pushed downward before the subframe 28 is disengaged from the body 12, damage to the mechanical-electrical integrated unit 20 and so forth, supported by the subframe 28, can be suppressed or avoided.

While several specific examples have been described in detail above, these are merely exemplary, and do not limit the scope of the claims. The technology defined in the claims includes various modifications and alterations of the specific examples described above. The technical elements described herein or in the drawings exhibit their technical usefulness alone or in combination.

What is claimed is:

1. A vehicle, comprising:
a body including a front compartment, the body including a first counterface that inclines downward in a rearward direction of the vehicle; and
a subframe configured to support an installed part disposed in the front compartment, the subframe being attached to the body from below, and including a second counterface facing the first counterface of the body, the second counterface being inclined downward in the rearward direction of the vehicle, at least one of the first counterface or the second counterface including a portion inclined rearward toward an inner side in a right-left direction of the vehicle, wherein
the second counterface faces the first counterface in a front-rear direction of the vehicle,
the subframe includes a pair of side rails extending along the front-rear direction and separate from each other in the right-left direction, and
each side rail of the pair of side rails includes the second counterface at a rear end portion of said each side rail.

2. The vehicle according to claim 1, wherein
the first counterface includes the portion inclined rearward toward the inner side in the right-left direction of the vehicle.

3. The vehicle according to claim 2, wherein
the portion inclined rearward toward the inner side in the right-left direction of the vehicle covers the entire first counterface in the right-left direction.

4. The vehicle according to claim 2, wherein
an inclination angle of the portion inclined rearward toward the inner side in the right-left direction of the vehicle in the first counterface is larger than 5 degrees.

5. The vehicle according to claim 1, wherein
said each side rail is directly fixed to the body by a bolt at the rear end portion of said each side rail, the bolt being rearward of the first counterface of the body and the second counterface of said each side rail.

6. A vehicle, comprising:
a body including a front compartment, the body including a first counterface that inclines downward in a rearward direction of the vehicle; and
a subframe configured to support an installed part disposed in the front compartment, the subframe being attached to the body from below, and including a second counterface facing the first counterface of the body, the second counterface being inclined downward in the rearward direction of the vehicle, at least one of the first counterface or the second counterface including a portion inclined rearward toward an inner side in a right-left direction of the vehicle, wherein
the second counterface faces the first counterface in a front-rear direction of the vehicle, and
the second counterface includes the portion inclined rearward toward the inner side in the right-left direction of the vehicle.

7. The vehicle according to claim 6, wherein
the portion inclined rearward toward the inner side in the right-left direction of the vehicle covers the entire second counterface in the right-left direction.

8. The vehicle according to claim 6, wherein
an inclination angle of the portion inclined rearward toward the inner side in the right-left direction of the vehicle in the second counterface is larger than 5 degrees.

9. The vehicle according to claim 8, wherein
both of the first counterface and the second counterface include the portion inclined rearward toward the inner side in the right-left direction of the vehicle.

\* \* \* \* \*